Jan. 1, 1929.
A. SHIELDS
PRIMING CUP
Filed July 20, 1926
1,697,330
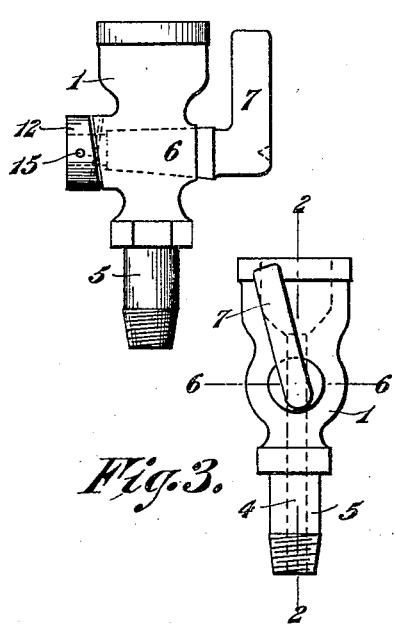
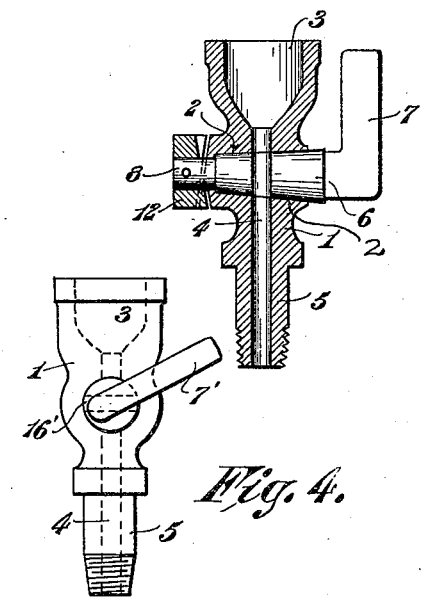
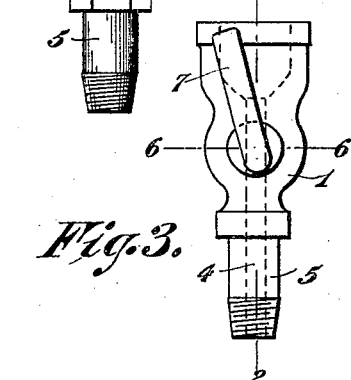
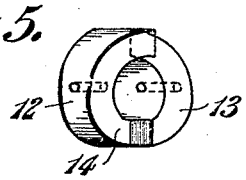
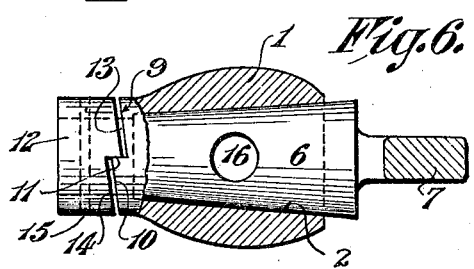
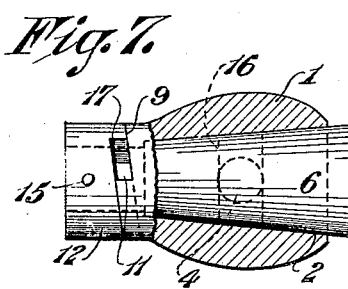
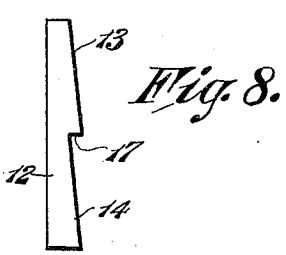
INVENTOR,
Archibald Shields,
BY
Harry W. Bown.
ATTORNEY.

Patented Jan. 1, 1929.

1,697,330

UNITED STATES PATENT OFFICE.

ARCHIBALD SHIELDS, OF BROOKLYN, NEW YORK.

PRIMING CUP.

Application filed July 20, 1926. Serial No. 123,650.

This invention relates to improvements in priming cups for introducing gasoline or other liquids into the combustion chamber of a motor vehicle.

An object of the invention is to provide a priming cup that obviates the use of coiled springs for drawing the plug of the cup to its seat. The use of these springs is objectionable because of the tendency to lose their elasticity, either wholly or partially, due to the heating and cooling of the metal resulting in the annealing or softening of the spring material.

Broadly, it comprises a priming cup having a tapered plug which fits a correspondingly shaped opening in the body of the cup. The body of the cup is formed with two inclined or wedge shaped surfaces and a part on the end of the plug with correspondingly shaped surfaces, whereby when the plug is rotated it is firmly drawn into the body of the cup thereby preventing leakage. The handle portion of the plug is so located that its weight automatically retains the plug firmly seated. The inclined surfaces, may, if desired, be formed as a thread of any suitable pitch.

Referring to the drawings:

Fig. 1 is an elevational view showing the handle portion and the cam or bushing member attached to the plug.

Fig. 2 is a vertical sectional view on a plane represented by the line 2—2 of Fig. 3.

Fig. 3 is an elevational view with the handle in the open position.

Fig. 4 is a view similar to Fig. 3 with the handle in the closed position.

Fig. 5 is a detail view of the cam element which is attached to the end of the plug.

Fig. 6 is a horizontal sectional view on the line 6—6 of Fig. 3.

Fig. 7 is a view similar to Fig. 6 but with the plug rotated for closing the opening, and Fig. 8 is a developed view of the cam or bushing member.

Referring to the drawings in detail:

1 designates the body portion of the cup which is formed with the cone shaped opening 2 and a cup shaped recess 3 into which the priming fluid is placed. The body portion is formed with an opening 4 which extends from the cup 3 down through the threaded stem 5. 6 designates the cone shaped plug having the handle portion 7 and the reduced part 8. Two substantially parallel inclined surfaces 9 and 10 are formed on the casing 1 adjacent the smaller end of the cone shaped opening 2. These surfaces terminate with the shoulder portion 11, only one of which is designated. 12 designates a cam member formed with two substantially parallel inclined surfaces 13 and 14 which member is secured to the reduced portion 8 of the plug 6 by means of a pin 15. The plug 6 is formed with an opening 16, which, when the handle 7 is in the position shown in Fig. 3 registers with the opening 4. When in the position shown at 7' the opening 16 is then in the position shown at 16' thus closing the opening 4. When the handle 7 is turned to the position in Fig. 4, the two cam shaped surfaces 13 and 14 of the member 12 will engage the two cam shaped surfaces 9 and 10 thus moving the plug 6 axially toward the left and seating it firmly in the conical shaped opening 2. The position of the handle 7 in Fig. 4 operates by reason of its weight to retain the plug in its closed position.

It will be noticed that when the handle 7 is thrown to the open position that the shoulder 11 is engaged by the shoulder 17 of the cam shaped member 12. Reference to Fig. 7 will show that the shoulders 11 and 17 are separated when the opening 4 is closed by the plug 6. It will be seen that the handle 7 shown in Fig. 3 does not stand in the same plane as the opening 4 through the body part but is offset therefrom a small angle. This construction serves the purpose to retain the plug in its closed position shown in Fig. 4.

It will therefore be seen from this description that I have provided a very simple and efficient construction for forcing the plug 6 to its tapered seat and one that may be readily moved therefrom when the handle 7 is turned to the position shown in Fig. 3.

What I claim is:

1. A valve construction comprising a body member having an opening therethrough, a plug receiving portion in the opening of the body member which is tapered, a plug in the said portion of the opening and tapered for a portion of its length and which is formed with a reduced end portion that extends beyond the plug receiving portion of the opening, the body member having two inclined cam surfaces that are parallel and adjacent to each other and extend in the same direction with two stop shoulders terminating at the ends and between the cam surfaces, a ring member secured to the reduced end portion of the plug and formed with two inclined cam surfaces that are parallel to each other and with two stop shoulders located between the two cam surfaces and terminating at the ends of the cams, which two respective cam surfaces contact with the parallel cam surfaces on the body member for moving the plug endwise in the opening when the plug is rotated in one direction to close the valve, and, when rotated in the opposite direction, the said shoulders will contact to limit the rotary movement of the valve when in its open position.

2. A valve construction comprising a body having an opening extending lengthwise thereof, and having another opening tapered for a portion of its length and located transversely of the first opening, a tapered plug to fit the other opening and formed with an opening therethrough to register with the first opening, the plug having a reduced integral end part that extends beyond the valve body, the body having two substantially parallel and inclined cam shaped surfaces that are located adjacent the reduced part of the tapered opening, a ring member on the reduced end part of the plug and secured thereto, the ring member having inclined cam surfaces that are parallel to the inclined cam surfaces of the body and which are designed to contact with the cam surfaces on the body member for moving the plug axially when the plug is rotated to cause the opening through the plug to assume a position transverse of the opening through the body.

ARCHIBALD SHIELDS.